United States Patent
Imai et al.

(10) Patent No.: US 10,309,285 B2
(45) Date of Patent: *Jun. 4, 2019

(54) EXHAUST GAS CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Daichi Imai, Sunto-gun (JP); Hiromasa Nishioka, Susono (JP); Kiyoshi Fujiwara, Susono (JP); Yoshio Yamashita, Susono (JP); Kouta Tanaka, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 162 days.

This patent is subject to a terminal disclaimer.

(21) Appl. No.: 15/416,428

(22) Filed: Jan. 26, 2017

(65) Prior Publication Data

US 2017/0211452 A1 Jul. 27, 2017

(30) Foreign Application Priority Data

Jan. 27, 2016 (JP) ................. 2016-013580

(51) Int. Cl.
*F01N 9/00* (2006.01)
*B01D 46/00* (2006.01)
(Continued)

(52) U.S. Cl.
CPC .......... *F01N 9/002* (2013.01); *B01D 46/0063* (2013.01); *B01D 46/442* (2013.01);
(Continued)

(58) Field of Classification Search
None
See application file for complete search history.

(56) References Cited

U.S. PATENT DOCUMENTS

2003/0200746 A1 10/2003 Saito et al.
2004/0055287 A1* 3/2004 Sato .................... F01N 3/0231
60/297
(Continued)

FOREIGN PATENT DOCUMENTS

GB 2496876 A 5/2013
JP 2003-184536 A 7/2003
(Continued)

OTHER PUBLICATIONS

Notice of Allowance issued in U.S. Application No. 15/416,235 dated Jan. 17, 2019.

*Primary Examiner* — Amber R Orlando
(74) *Attorney, Agent, or Firm* — Finnegan, Henderson, Farabow, Garrett & Dunner, LLP

(57) ABSTRACT

An exhaust gas control system for an internal combustion engine, before execution of a filter regeneration process, executes a pre-regeneration process that is a process of raising a temperature of a filter to a second target temperature lower than a first target temperature and increasing the concentration of NO2 contained in exhaust gas flowing into the filter for a predetermined period. The first target temperature during execution of the filter regeneration process in the case where a speed of change in a detected value of a differential pressure sensor during execution of the pre-regeneration process is high is set so as to be lower than the first target temperature in the case where the speed of change is low.

5 Claims, 10 Drawing Sheets

(51) Int. Cl.
*B01D 46/44* (2006.01)
*B01D 46/46* (2006.01)
*F01N 3/021* (2006.01)
*F01N 3/023* (2006.01)
*F01N 3/031* (2006.01)
*F01N 3/035* (2006.01)
*F01N 3/025* (2006.01)
*F01N 3/027* (2006.01)

(52) U.S. Cl.
CPC ............ *B01D 46/46* (2013.01); *F01N 3/021* (2013.01); *F01N 3/023* (2013.01); *F01N 3/035* (2013.01); *B01D 2279/30* (2013.01); *F01N 3/027* (2013.01); *F01N 3/0253* (2013.01); *F01N 2560/08* (2013.01); *F01N 2900/0418* (2013.01); *F01N 2900/0601* (2013.01); *F01N 2900/1402* (2013.01); *F01N 2900/1406* (2013.01); *F01N 2900/1602* (2013.01); *F01N 2900/1606* (2013.01); *Y02T 10/47* (2013.01)

(56) References Cited

U.S. PATENT DOCUMENTS

| | | |
|---|---|---|
| 2006/0225409 A1 | 10/2006 | Kuboshima et al. |
| 2008/0196395 A1 | 3/2008 | Hashizume |
| 2009/0019831 A1 | 1/2009 | Heibel et al. |
| 2016/0222900 A1* | 8/2016 | Nishizawa ............ F01N 3/023 |

FOREIGN PATENT DOCUMENTS

| | | |
|---|---|---|
| JP | 2003-254042 | 9/2003 |
| JP | 2003-314249 | 11/2003 |
| JP | 2004-225616 | 8/2004 |
| JP | 2005-2830 | 1/2005 |
| JP | 2005-048709 A | 2/2005 |
| JP | 2010-534290 A | 11/2010 |
| JP | 2011-169235 | 9/2011 |

* cited by examiner

EXHAUST GAS CONTROL SYSTEM FOR INTERNAL COMBUSTION ENGINE

INCORPORATION BY REFERENCE

The disclosure of Japanese Patent Application No. 2016-013580 filed on Jan. 27, 2016 including the specification, drawings and abstract is incorporated herein by reference in its entirety.

BACKGROUND

1. Technical Field

The embodiment relates to an exhaust gas control system for an internal combustion engine.

2. Description of Related Art

In an internal combustion engine mounted on a vehicle, or the like, there is known a technique for arranging a filter in an exhaust passage of the internal combustion engine in order to reduce emissions of particulate matter, emitted from the internal combustion engine, into the atmosphere. As a particulate matter accumulation amount in such a filter excessively increases, a pressure loss in the filter becomes excessive, with the result that back pressure that acts on the internal combustion engine increases. For this reason, when the difference (upstream-downstream differential pressure) between an exhaust pressure upstream of the filter and an exhaust pressure downstream of the filter is larger than or equal to a predetermined threshold, it is required to execute a process (filter regeneration process) for oxidizing and removing particulate matter accumulated in the filter by placing the surroundings of the filter in a high temperature and oxygen excessive atmosphere as needed.

The particulate matter that accumulates in the filter contains soluble organic fraction and soot. Even when the amount of particulate matter accumulated in the filter remains unchanged, the upstream-downstream differential pressure can vary depending on the ratio between the amount of soluble organic fraction and the amount of soot. For this reason, there is known the following method (see, for example, Japanese Patent Application Publication No. 2011-169235 (JP 2011-169235 A). In the method, a preprocess of oxidizing and removing soluble organic fraction accumulated in the filter by raising the temperature of the filter to a temperature at which soluble organic fraction oxidizes is initially executed, and then a process of oxidizing and removing soot accumulated in the filter by raising the temperature of the filter to a temperature at which soot is presumed to oxidize (a temperature higher than the temperature at which soluble organic fraction oxidizes) at the time when the upstream-downstream differential pressure in a state where soluble organic fraction has been removed is larger than or equal to a predetermined value is executed.

SUMMARY

Incidentally, the inventors of the present application found that the oxidation rate of soot accumulated in the filter is not uniform but the oxidation rate varies depending on the crystal structure of the soot. Because of this, if the filter regeneration process is executed without consideration of the difference in oxidization rate due to the crystal structure of soot, the temperature of the filter can excessively rises, for example, when the proportion of the amount of accumulated soot having such a crystal structure that the oxidation rate tends to increase within soot accumulated in the filter is high.

The embodiment provides an exhaust gas control system for an internal combustion engine, which executes a filter regeneration process for oxidizing and removing particulate matter accumulated in a filter provided in an exhaust passage of the internal combustion engine and which oxidizes and removes particulate matter accumulated in the filter while suppressing an excessive rise in the temperature of the filter.

The embodiment, before execution of the filter regeneration process, executes a pre-regeneration process at a temperature lower than a temperature at the time when a filter regeneration process is executed and changes a target value of the temperature of the filter during execution of the filter regeneration process in response to a speed of change in upstream-downstream differential pressure during the pre-regeneration process.

More specifically, an exhaust gas control system for an internal combustion engine in an aspect of the embodiment includes: a filter that is arranged in an exhaust passage of the internal combustion engine and that collects particulate matter that is emitted from the internal combustion engine; a differential pressure sensor that detects an upstream-downstream differential pressure that is a difference between an exhaust pressure upstream of the filter and an exhaust pressure downstream of the filter; acquisition means for acquiring a particulate matter accumulation amount that is an amount of particulate matter collected in the filter; and regeneration means for, when the particulate matter accumulation amount acquired by the acquisition means is larger than or equal to a predetermined threshold, executing a filter regeneration process that is a process of oxidizing and removing particulate matter collected in the filter by raising a temperature of the filter to a first target temperature. The regeneration means, when the particulate matter accumulation amount that is acquired by the acquisition means becomes larger than or equal to the predetermined threshold, executes for a predetermined period a pre-regeneration process that is a process of raising the temperature of the filter to a second target temperature lower than the first target temperature and increasing the concentration of nitrogen dioxide ($NO_2$) contained in exhaust gas flowing into the filter, and executes the filter regeneration process after completion of the pre-regeneration process. The regeneration means sets the first target temperature and executes the filter regeneration process such that the first target temperature in the case where a speed of change in a detected value of the differential pressure sensor during execution of the pre-regeneration process is high is lower than the first target temperature in the case where the speed of change is low.

The inventors of the present application found that soot that is easily oxidizable due to a difference in its crystal structure is contained in soot that is emitted from the internal combustion engine. Easily-oxidizable soot is presumably soot having a large number of lattice defects. Soot having a large number of lattice defects in the embodiment is soot that has not only a peak in a G-band derived from crystals but also a peak in a D-band derived from defects in a spectrum that is obtained through Raman scattering spectroscopy and of which the peak value of the D-band is larger than or equal to a predetermined value, and is, for example, soot like activated carbon. Hereinafter, soot having a large number of lattice defects may be referred to as defective soot.

The defective soot is more easily oxidizable than soot having a small number of lattice defects as described above. For this reason, under the same temperature condition, the oxidation rate of defective soot tends to be higher than the oxidation rate of soot having a small number of lattice defects. Thus, the amount of particulate matter that is oxidized per unit time during execution of the filter regeneration process in the case where the proportion of the amount of accumulated defective soot to the total amount of particulate matter accumulated in the filter (particulate matter accumulation amount) (hereinafter, referred to as defective soot ratio) is large tends to be larger than the amount of particulate matter that is oxidized per unit time during execution of the filter regeneration process in the case where the defective soot ratio is small. Accordingly, the temperature of the filter tends to rise. If the first target temperature at the time when the filter regeneration process is executed is set without consideration of such a situation, the temperature of the filter can excessively rise in the case where the filter regeneration process is executed in a state where the defective soot ratio is high.

In contrast to this, an exhaust gas control system for an internal combustion engine according to the embodiment initially executes the pre-regeneration process for the predetermined period at the time when the particulate matter accumulation amount in the filter becomes larger than or equal to the predetermined threshold, and executes the filter regeneration process after completion of the pre-regeneration process. The first target temperature at the time when the filter regeneration process is executed is set in response to the speed of change in a detected value (upstream-downstream differential pressure) of the differential pressure sensor during execution of the pre-regeneration process. The predetermined period is a period sufficiently shorter than a period required to execute the filter regeneration process, and is a short period to such an extent that slightest part of defective soot accumulated in the filter is oxidized. According to the findings of the inventors of the present application, defective soot is easily oxidized at a lower temperature than soot having a small number of lattice defects under the existence of $NO_2$. Thus, the amount of particulate matter that is oxidized per unit time during execution of the pre-regeneration process in the case where the defective soot ratio is large is larger than the amount of particulate matter that is oxidized per unit time during execution of the pre-regeneration process in the case where the defective soot ratio is small. Accordingly, the speed of change (the speed of deceleration) in upstream-downstream differential pressure during execution of the pre-regeneration process increases. In consideration of such a correlation, when the first target temperature in the case where the speed of change in upstream-downstream differential pressure during execution of the pre-regeneration process is large is set so as to be lower than the first target temperature in the case where the speed of change in upstream-downstream differential pressure during execution of the pre-regeneration process is small. Thus, the first target temperature in the case where the defective soot ratio is high is set so as to be lower than the first target temperature in the case where the defective soot ratio is low. As a result, even when the filter regeneration process is executed in a state where the defective soot ratio is high, it is possible to suppress an excessive rise in the temperature of the filter.

The aspect of the embodiment may be defined as follows. An exhaust gas control system for an internal combustion engine includes: a filter arranged in an exhaust passage of the internal combustion engine, the filter being configured to collect particulate matter that is emitted from the internal combustion engine; a differential pressure sensor configured to detect an upstream-downstream differential pressure that is a difference between an exhaust pressure upstream of the filter and an exhaust pressure downstream of the filter; and an electronic control unit configured to i) acquire a particulate matter accumulation amount that is an amount of particulate matter collected in the filter, ii) execute a filter regeneration process, the filter regeneration process being a process of, when the particulate matter accumulation amount is larger than or equal to a predetermined threshold, oxidizing and removing particulate matter collected in the filter by raising a temperature of the filter to a first target temperature, iii) execute a pre-regeneration process for a predetermined period and execute the filter regeneration process after completion of the pre-regeneration process, the pre-regeneration process being a process of, when the particulate matter accumulation amount becomes larger than or equal to the predetermined threshold, raising the temperature of the filter to a second target temperature lower than the first target temperature and increasing the concentration of nitrogen dioxide contained in exhaust gas flowing into the filter, and iv) set the first target temperature and execute the filter regeneration process such that the first target temperature in the case where a speed of change in a detected value of the differential pressure sensor during execution of the pre-regeneration process is high is lower than the first target temperature in the case where the speed of change is low.

The predetermined period may be a set time set in advance. In this case, the regeneration means may obtain an amount of change in the detected value of the differential pressure sensor in the predetermined period as a physical quantity that correlates with the speed of change in the detected value of the differential pressure sensor during execution of the pre-regeneration process. The regeneration means may set the first target temperature and execute the filter regeneration process such that the first target temperature in the case where the amount of change is large is lower than the first target temperature in the case where the amount of change is small. With this configuration, it is possible to reduce the execution period of the pre-regeneration process to a short time as much as possible.

The predetermined period may be a period until an amount of change in the detected value of the differential pressure sensor reaches a set amount set in advance. In this case, the regeneration means may obtain the length of the predetermined period as a physical quantity that correlates with the speed of change in the detected value of the differential pressure sensor during execution of the pre-regeneration process. The regeneration means may set the first target temperature and execute the filter regeneration process such that the first target temperature in the case where the length of the predetermined period is short is lower than the first target temperature in the case where the length of the predetermined period is long. With this configuration, by setting the set amount to a value larger than variations in the amount of change in upstream-downstream differential pressure due to unevenness of the differential pressure sensor, or the like, it is possible to further accurately detect the physical quantity that correlates with the speed of change in upstream-downstream differential pressure during execution of the pre-regeneration process.

The regeneration means according to the aspect of the embodiment may, on the basis of such a characteristic that an oxidation rate of the particulate matter accumulated in the filter in the case where the speed of change in the detected value of the differential pressure sensor during execution of the pre-regeneration process is high is higher than the oxidation rate of the particulate matter accumulated in the filter in the case where the speed of change is low and the oxidation rate of the particulate matter accumulated in the filter in the case where the temperature of the filter is high is higher than the oxidation rate of the particulate matter accumulated in the filter in the case where the temperature of the filter is low, estimate a relationship between the temperature of the filter and the oxidation rate of the particulate matter accumulated in the filter, the relationship corresponding to the speed of change in the detected value of the differential pressure sensor during execution of the pre-regeneration process. The regeneration means may obtain a temperature of the filter at which the oxidation rate of the particulate matter is equal to a predetermined upper limit value in the estimated relationship, and set the obtained temperature for the first target temperature. The upper limit value is presumably such a value that, when the oxidation rate of the particulate matter accumulated in the filter exceeds the upper limit value, the temperature of the filter excessively rises. The upper limit value is set so as to be a smaller value as the temperature of the filter rises. With this configuration, it is possible to set the first target temperature to a temperature as high as possible within the range in which it is possible to suppress an excessive rise in the temperature of the filter. For this reason, it is possible to efficiently oxidize and remove particulate matter accumulated in the filter while suppressing an excessive rise in the temperature of the filter.

When soluble organic fraction is accumulated in the filter at the time when the pre-regeneration process is executed, the defective soot ratio is difficult to be accurately reflected on the speed of change in upstream-downstream differential pressure in the predetermined period. More specifically, soluble organic fraction is more easily oxidizable than defective soot. For this reason, when the case where the pre-regeneration process is executed in a state where the soluble organic fraction is accumulated in the filter is compared with the case where the pre-regeneration process is executed in a state where the soluble organic fraction is not accumulated in the filter, even when the defective soot ratio is the same, the speed of change in upstream-downstream differential pressure in the predetermined period in the case where the soluble organic fraction is accumulated in the filter is higher. Thus, when the first target temperature is set in response to the speed of change in the detected value of the differential pressure sensor in the case where the pre-regeneration process is executed in a state where the soluble organic fraction is accumulated in the filter, the first target temperature can be lower than a temperature suitable for the defective soot ratio. As a result, it may be difficult to efficiently oxidize and remove particulate matter accumulated in the filter.

The regeneration means according to the aspect of the embodiment may execute a soluble organic fraction removal process that is a process of, before executing the pre-regeneration process, oxidizing and removing soluble organic fraction accumulated in the filter by raising the temperature of the filter to a third target temperature that is lower than the second target temperature and at which the soluble organic fraction oxidizes. With this configuration, execution of the pre-regeneration process in a state where the soluble organic fraction is accumulated in the filter is suppressed, so it is possible to set the first target temperature to a temperature suitable for the defective soot ratio of particulate matter accumulated in the filter. As a result, it is possible to efficiently oxidize and remove the particulate matter accumulated in the filter.

According to the embodiment, in an exhaust gas control system for an internal combustion engine, which executes the filter regeneration process for oxidizing and removing particulate matter accumulated in the filter provided in the exhaust passage of the internal combustion engine, it is possible to oxidize and remove particulate matter accumulated in the filter while suppressing an excessive rise in the temperature of the filter.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments will be described with reference to the accompanying drawings. The sizes, materials, shapes, relative arrangement, and the like, of components described in the present embodiments do not intend to limit the technical scope unless otherwise specified.

Figure 1:
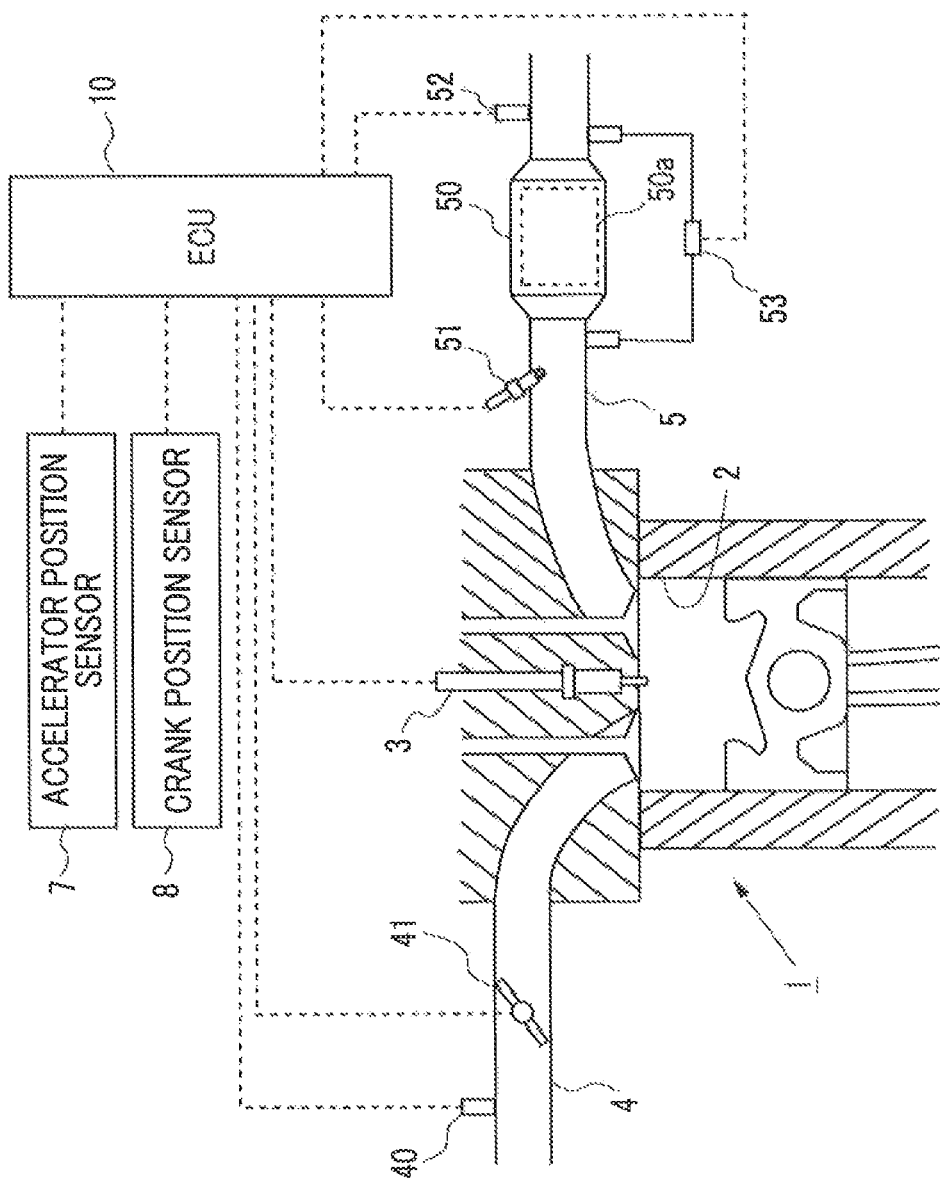
FIG. 1 is a view that shows the schematic configuration of an internal combustion engine and its intake and exhaust systems, to which the embodiment is applied.

Initially, a first embodiment will be described with reference to FIG. 1 to FIG. 10. FIG. 1 is a view that shows the schematic configuration of an internal combustion engine and its intake and exhaust systems, to which the embodiment is applied. The internal combustion engine 1 shown in FIG. 1 is a compression-ignition internal combustion engine (diesel engine) that uses light oil as fuel. The internal combustion engine 1 includes a fuel injection valve 3 that injects fuel into a cylinder 2.

The internal combustion engine 1 is connected to an intake passage 4. An air flow meter 40 and a throttle valve 41 are provided in the intake passage 4. The air flow meter 40 outputs an electrical signal corresponding to the amount (mass) of intake air (air) flowing through the intake passage 4. The throttle valve 41 is arranged in the intake passage 4 at a portion downstream of the air flow meter 40. The throttle valve 41 adjusts the intake air amount of the internal combustion engine 1 by changing the passage sectional area of the intake passage 4.

The internal combustion engine 1 is connected to an exhaust passage 5. A filter casing 50 is arranged in the exhaust passage 5. The filter casing 50 accommodates a particulate filter 50a (hereinafter, simply referred to as filter 50a) that collects particulate matter in exhaust gas. The filter 50a is a wall-flow particulate filter. An oxidation catalyst is supported on the base material of the filter 50a. A fuel addition valve 51 is provided in the exhaust passage 5 at a portion upstream of the filter casing 50. The fuel addition valve 51 adds unburned fuel into exhaust gas.

An exhaust gas temperature sensor 52 is arranged in the exhaust passage 5 at a portion downstream of the filter casing 50. The exhaust gas temperature sensor 52 outputs an electrical signal that correlates with the temperature of exhaust gas flowing out from the filter casing 50. A differential pressure sensor 53 is attached to the exhaust passage 5. The differential pressure sensor 53 outputs an electrical signal corresponding to the difference (hereinafter, referred to as upstream-downstream differential pressure) between an exhaust gas pressure upstream of the filter 50a and an exhaust gas pressure downstream of the filter 50a.

An electronic control unit 10 is provided together with the thus configured internal combustion engine 1. The electronic control unit 10 is an electronic control unit including a CPU, a ROM, a RAM, a backup RAM, and the like. The electronic control unit 10 is electrically connected to various sensors, such as an accelerator position sensor 7 and a crank position sensor 8, in addition to the above-described air flow meter 40, exhaust gas temperature sensor 52 and differential pressure sensor 53. The accelerator position sensor 7 is a sensor that outputs an electrical signal that correlates with the operation amount of an accelerator pedal (not shown) (accelerator operation amount). The crank position sensor 8 is a sensor that outputs an electrical signal that correlates with the rotation position of an engine output shaft (crankshaft) of the internal combustion engine 1. The output signals of these various sensors are input to the electronic control unit 10.

The electronic control unit 10 is electrically connected to various devices, such as the fuel injection valve 3, the throttle valve 41 and the fuel addition valve 51. The electronic control unit 10 controls the various devices on the basis of the output signals of the above-described various sensors. For example, the electronic control unit 10 computes a target air-fuel ratio of air-fuel mixture on the basis of the output signals of the accelerator position sensor 7 and crank position sensor 8, and computes a target fuel injection amount per one cylinder (fuel injection time) from the target air-fuel ratio and the output signal of the air flow meter 40. The electronic control unit 10 controls the fuel injection valve 3 in accordance with the target fuel injection amount. The electronic control unit 10 executes a filter regeneration process for oxidizing and removing particulate matter accumulated in the filter 50a in order to reduce clogging of the filter 50a due to accumulation of particulate matter in the filter 50a during an operation period of the internal combustion engine 1 as needed. Hereinafter, a method of executing the filter regeneration process in the present embodiment will be described.

When the amount (particulate matter accumulation amount) $\Sigma PM$ of particulate matter accumulated in the filter 50a exceeds a predetermined threshold $\Sigma PMthr$, the back pressure due to the pressure loss in the filter 50a becomes excessively high, leading to inconveniences, such as a decrease in the output of the internal combustion engine 1 and deterioration of fuel consumption rate. For this reason, the electronic control unit 10 estimates a particulate matter accumulation amount $\Sigma PM$ in the filter 50a at predetermined intervals during the operation period of the internal combustion engine 1, and executes the filter regeneration process at the time when the particulate matter accumulation amount $\Sigma PM$ has reached a predetermined threshold $\Sigma PMthr$. The particulate matter accumulation amount $\Sigma PM$ in the filter 50a is estimated by a method of integrating the difference between the amount of particulate matter that is collected by the filter 50a per unit time and the amount of particulate matter that is oxidized in the filter 50a per unit time. At this time, the amount of particulate matter that is collected by the filter 50a per unit time is obtained by multiplying the amount of particulate matter that is emitted from the internal combustion engine 1 per unit time by a collection rate that is determined depending on the specifications of the filter 50a. The amount of particulate matter that is emitted from the internal combustion engine 1 per unit time is estimated from the operation state of the internal combustion engine 1. On the other hand, the amount of particulate matter that is oxidized in the filter 50a per unit time is computed by using the temperature of the filter 50a, the last value of the particulate matter accumulation amount $\Sigma PM$, the concentration of oxygen in exhaust gas flowing into the filter 50a, and the concentration of $NO_2$ in exhaust gas flowing into the filter 50a as parameters. The temperature of the filter 50a is estimated on the basis of a detected value of the exhaust gas temperature sensor 52. The concentration of oxygen in exhaust gas flowing into the filter 50a may be estimated from the operation state of the internal combustion engine 1 or may be detected by an oxygen concentration sensor. The concentration of $NO_2$ in exhaust gas flowing into the filter 50a may be estimated from the operation state of the internal combustion engine 1 or may be estimated from a detected value of a $NO_x$ sensor. The particulate matter accumulation amount $\Sigma PM$ in the filter 50a may be computed by using an upstream-downstream differential pressure that is detected by the differential pressure sensor 53 and an exhaust flow rate (the total of a fuel injection amount and an intake air amount) as parameters. The electronic control unit 10 obtains the particulate matter accumulation amount $\Sigma PM$ in the filter 50a with such a method. Thus, acquisition means according to the embodiment is implemented.

The following method may be used as an example method of executing the filter regeneration process. Fuel is added from the fuel addition valve 51 to exhaust gas. The added fuel is oxidized with an oxidation catalyst that is supported on the filter 50a. The temperature of the filter 50a is raised to a particulate matter oxidizable temperature (first target temperature) with the heat of reaction that occurs at that time. In the internal combustion engine 1 including no fuel addition valve 51, the fuel injection valve 3 of the cylinder 2 in exhaust stroke may be caused to inject (post injection) to thereby supply unburned fuel to the filter 50a. When a heater that electrically heats the filter 50a is provided together with the internal combustion engine 1, the temperature of the filter 50a may be raised to the first target temperature with the heater.

The first target temperature is desirably set to a temperature at which particulate matter that is emitted from the internal combustion engine 1 is efficiently oxidized and removed and at which the temperature of the filter 50a does not excessively rise during execution of the filter regeneration process. Incidentally, the temperature of the filter 50a during execution of the filter regeneration process depends on how much particulate matter is easily oxidizable. That is, as the amount of accumulated easily-oxidizable particulate matter within the total amount of particulate matter accumulated in the filter 50a increases, the amount of particulate matter that is oxidized per unit time increases during execution of the filter regeneration process. Therefore, the temperature of the filter 50a tends to rise to a higher temperature. However, conventionally, it has been presumed that there is a difference in easiness of oxidation between soluble organic fraction and soot that constitute particulate matter and easiness of oxidation of soot is uniform. For this reason, it has been proposed a method of setting the first target temperature on the basis of the proportion of the amount of accumulated soluble organic fraction to the total amount of particulate matter accumulated in the filter 50a. However, it has not been proposed yet a method of setting the first target temperature in consideration of the fact that there is a difference in easiness of oxidation within soot.

Figure 2:
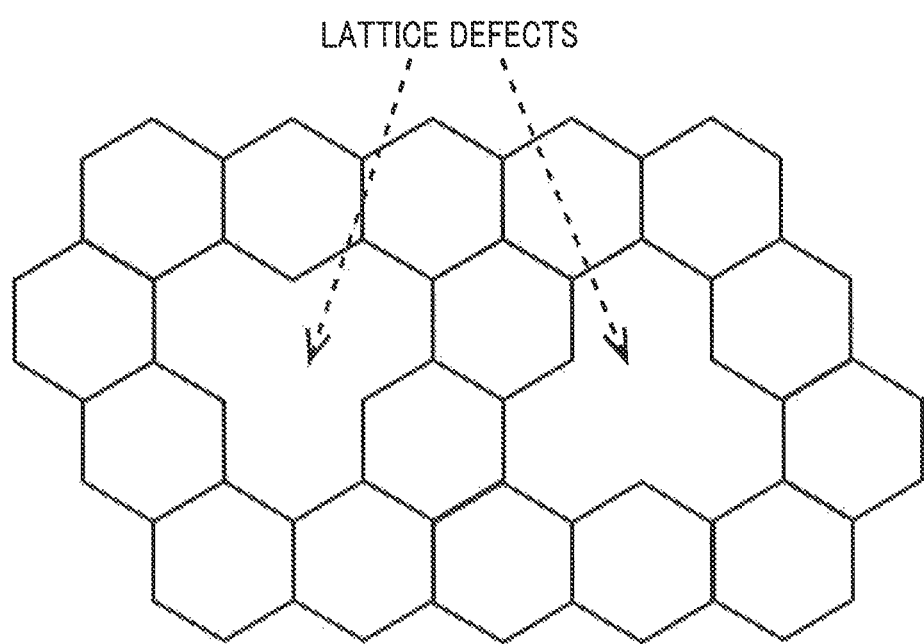
FIG. 2 is a view for illustrating the concept of lattice defects of defective soot.
Figure 3A:
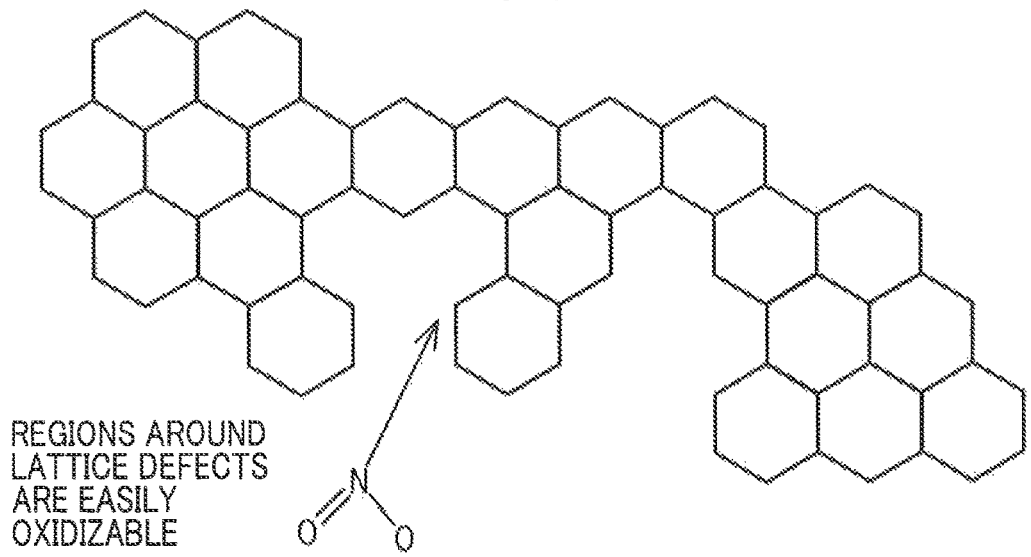
FIG. 3A and FIG. 3B are views for illustrating a concept that defective soot is oxidized.
Figure 3B:
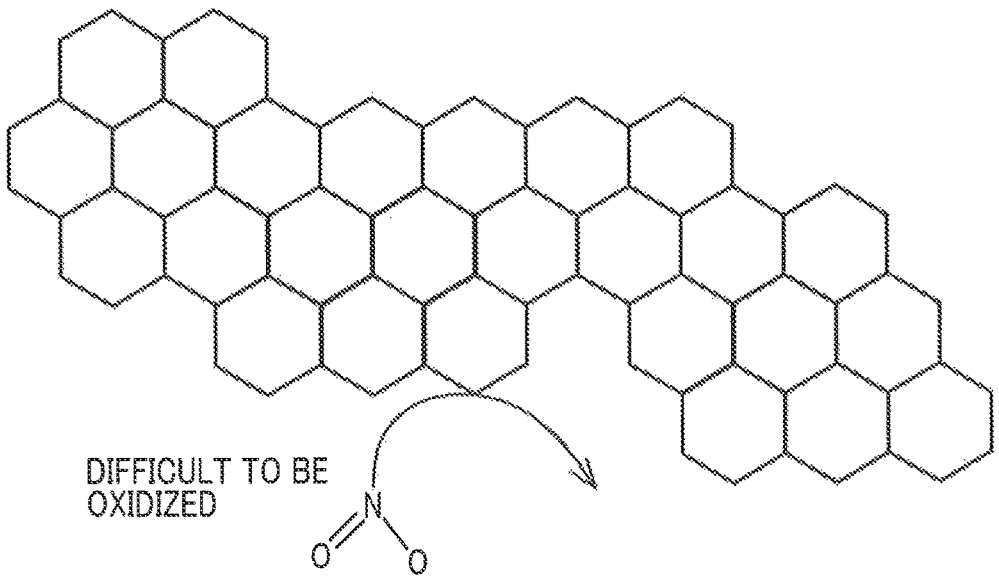
Figure 4:
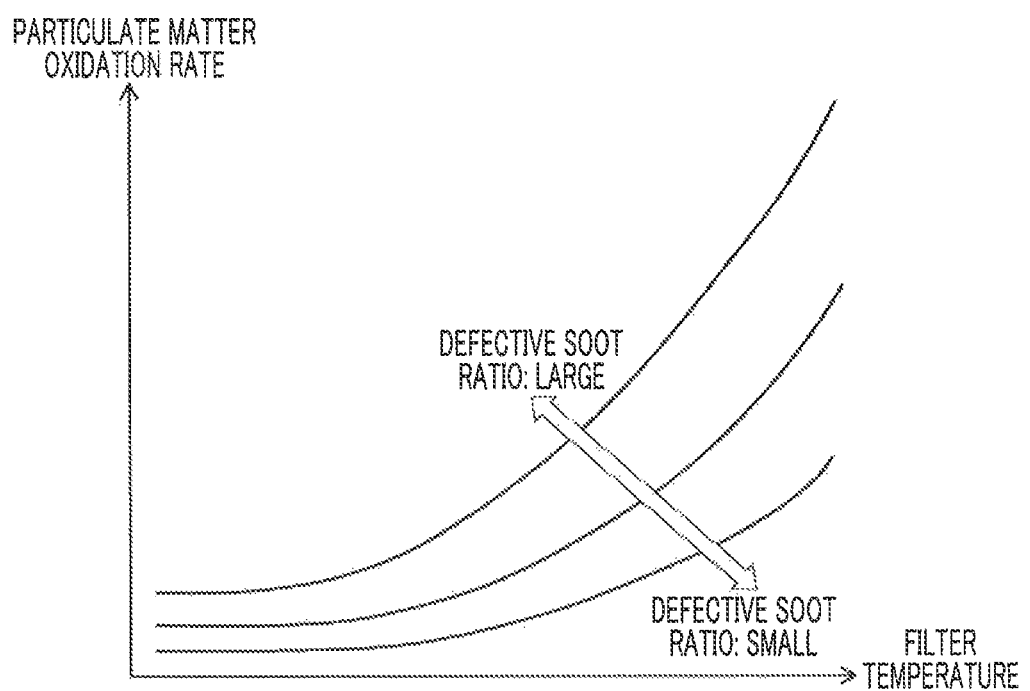
FIG. 4 is a graph for illustrating the influence of an accumulated defective soot ratio on a particulate matter oxidation rate as for the correlation between a filter temperature and a particulate matter oxidation rate.

As for the oxidation property of soot, the inventors of the present application diligently carried out an experiment and a verification and, as a result, found that easiness of oxidation of soot that is emitted from the internal combustion engine 1 is not uniform but easiness of oxidation varies depending on the crystal structure. That is, the inventors of the present application found that soot having an easily-oxidizable crystal structure is contained in soot that is emitted from the internal combustion engine 1. Soot having an easily-oxidizable crystal structure is presumably soot having a large number of lattice defects (defective soot) as described above. FIG. 2 is a view that shows the concept of lattice defects in the embodiment. As shown in FIG. 2, in a crystal lattice composed of carbon atoms, a region in which a grating density is low because of irregularities of atomic arrangement is a lattice defect in the embodiment. Defective soot in the embodiment is soot having a large number of the above-described lattice defects, and is soot of which the peak value of a D-band derived from defects is larger than or equal to a predetermined value in a spectrum that is obtained through Raman scattering spectroscopy, as described above. FIG. 3A and FIG. 3B show concepts that the above-described defective soot is oxidized. As shown in FIG. 3A and FIG. 3B, since portions of defective soot around lattice defects tend to be oxidized by an oxide (for example, $NO_2$), it is presumed that soot is easily oxidized as a whole. The amount of particulate matter that is oxidized per unit time during execution of the filter regeneration process in the case where the proportion (defective soot ratio) of the amount of accumulated defective soot to the total amount of particulate matter accumulated in the filter 50a (particulate matter accumulation amount $\Sigma PM$) is large, is larger than the amount of particulate matter that is oxidized per unit time during execution of the filter regeneration process in the case where the proportion of the amount of accumulated defective soot to the total amount of particulate matter accumulated in the filter 50a is small. That is, a particulate matter oxidation rate during execution of the filter regeneration process in the case where the defective soot ratio is large is higher than the particulate matter oxidation rate during execution of the filter regeneration process in the case where the defective soot ratio is small. FIG. 4 is a graph for illustrating the influence of an accumulated defective soot ratio on the particulate matter oxidation rate as for the correlation between a filter temperature and a particulate matter oxidation rate. In FIG. 4, the oxidation rate of particulate matter accumulated in the filter 50a (hereinafter, simply referred to as particulate matter oxidation rate) increases as the temperature of the filter 50a rises. In addition, the particulate matter oxidation rate in the case where when the defective soot ratio is large is higher than the particulate matter oxidation rate in the case where the defective soot ratio is small. If the first target temperature is set without consideration of these characteristics, the particulate matter oxidation rate becomes higher than an assumed rate at the time when the filter regeneration process is executed in a state where the defective soot ratio is high. As a result, the temperature of the filter 50a can excessively rise to a temperature higher than the first target temperature.

Figure 5:
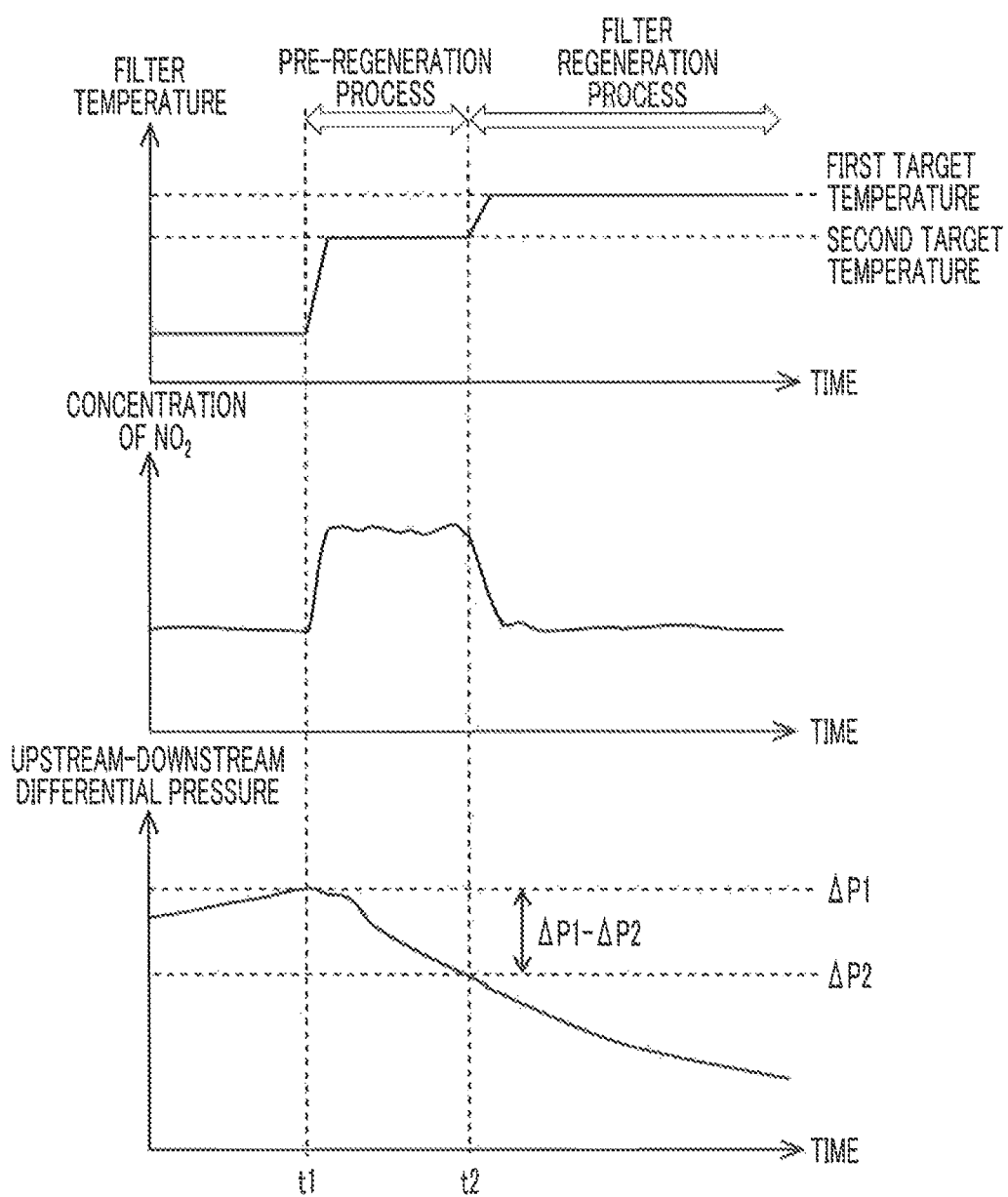
FIG. 5 is a timing chart that shows the flow of a series of a pre-regeneration process and a filter regeneration process.

In the filter regeneration process according to the present embodiment, the first target temperature is set in consideration of the defective soot ratio of soot accumulated in the filter 50a. Specifically, a pre-regeneration process is executed for a predetermined period before execution of the filter regeneration process, and the first target temperature is set on the basis of the speed of change in the upstream-downstream differential pressure during execution of the pre-regeneration process. FIG. 5 is a timing chart that shows changes with time in the temperature of the filter 50a (filter temperature), the concentration of $NO_2$ in exhaust gas flowing into the filter 50a, and the upstream-downstream differential pressure in the case where the pre-regeneration process and the filter regeneration process are executed. In FIG. 5, t1 indicates time at which the particulate matter accumulation amount $\Sigma PM$ in the filter 50a has reached the predetermined threshold $\Sigma PMthr$. As shown in FIG. 5, the electronic control unit 10 initially executes the pre-regeneration process for a predetermined period (a period of t1 to t2 in FIG. 5) at the time when the particulate matter accumulation amount $\Sigma PM$ has reached the predetermined threshold $\Sigma PMthr$ (t1 in FIG. 5), and starts the filter regeneration process (t2 in FIG. 5) at the time when the pre-regeneration process has ended. The pre-regeneration process is a process of raising the temperature of the filter 50a to a second target temperature higher than or equal to a temperature at which defective soot oxidizes and lower than a temperature at which soot having a small number of lattice defects oxidizes (first target temperature), and increasing the concentration of $NO_2$ contained in exhaust gas flowing into the filter 50a as compared to the concentration of $NO_2$ before execution of the pre-regeneration process. Under the existence of $NO_2$, defective soot is oxidized at a further lower temperature as compared to soot having a small number of lattice defects. For this reason, the second target temperature is set to a temperature (for example, about 400° C.) at which defective soot is oxidized and soot having a smaller number of lattice defects is not oxidized under the existence of $NO_2$. The predetermined period is a period sufficiently shorter than a period required to execute the filter regeneration process, and is a short period to such an extent that slightest part of defective soot accumulated in the filter is oxidized. When the pre-regeneration process is executed with such a method, the amount of particulate matter that is oxidized per unit time during execution of the pre-regeneration process in the case where the defective soot ratio is large is larger than the amount of particulate matter that is oxidized per unit time during execution of the pre-regeneration process in the case where the defective soot ratio is small. Accordingly, the speed of change (the speed of deceleration) in the detected value (upstream-downstream differential pressure) of the differential pressure sensor 53 during execution of the pre-regeneration process increases. That is, it may be regarded that the defective soot ratio in the case where the speed of change in upstream-downstream differential pressure during execution of the pre-regeneration process is large is higher than the defective soot ratio in the case where the speed of change in upstream-downstream differential pressure during execution of the pre-regeneration process is small. Thus, the first target temperature in the case where the speed of change in upstream-downstream differential pressure during execution of the pre-regeneration process is large is made shorter than the first target temperature in the case where the speed of change in upstream-downstream differential pressure during execution of the pre-regeneration process is small. As a result, it is possible to oxidize and remove particulate matter accumulated in the filter 50a while suppressing an excessive rise in the temperature of the filter 50a.

Figure 6:
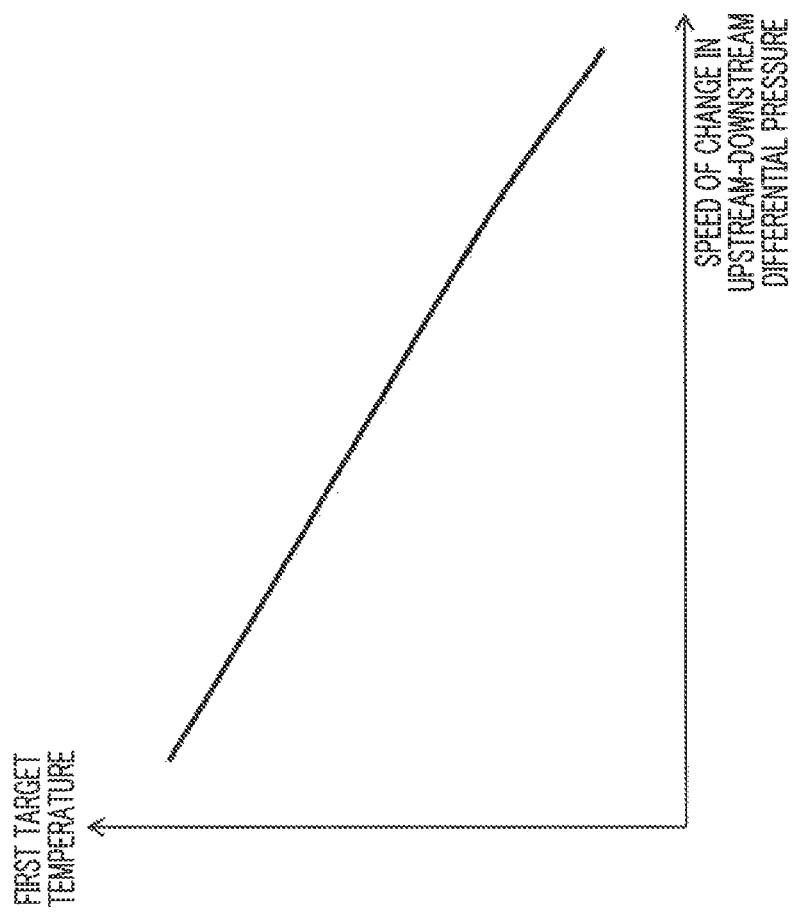
FIG. 6 is a graph that shows the relationship between a speed of change in a detected value (upstream-downstream differential pressure) of a differential pressure sensor during execution of the pre-regeneration process and a first target temperature.

The speed of change in upstream-downstream differential pressure during execution of the pre-regeneration process is allowed to be obtained by dividing the difference ($\Delta P1-\Delta P2$) between an upstream-downstream differential pressure $\Delta P1$ that is detected by the differential pressure sensor 53 at the time when the pre-regeneration process is started (t1 in FIG. 5) and an upstream-downstream differential pressure $\Delta P2$ that is detected by the differential pressure sensor 53 at the time when the pre-regeneration process is ended (t2 in FIG. 5) by the execution time (t2−t1) of the pre-regeneration process. The relationship between a speed of change in upstream-downstream differential pressure during execution of the pre-regeneration process and a first target temperature is obtained through adaptation process that utilizes an experiment, or the like, in advance, and the relationship is stored in the ROM of the electronic control unit 10 in form of a map or function expression. At this time, the relationship between a speed of change in upstream-downstream differential pressure during execution of the pre-regeneration process and a first target temperature is set such that, as shown in FIG. 6, the first target temperature in the case where the speed of change in upstream-downstream differential pressure during execution of the pre-regeneration process is large is lower than the first target temperature in the case where the speed of change in upstream-downstream differential pressure during execution of the pre-regeneration process is small. In FIG. 6, the relationship between a speed of change in upstream-downstream differential pressure during execution of the pre-regeneration process and a first target temperature is substantially a linear relationship; however, it can be a nonlinear relationship depending on the specifications of the internal combustion engine or filter.

Figure 7:
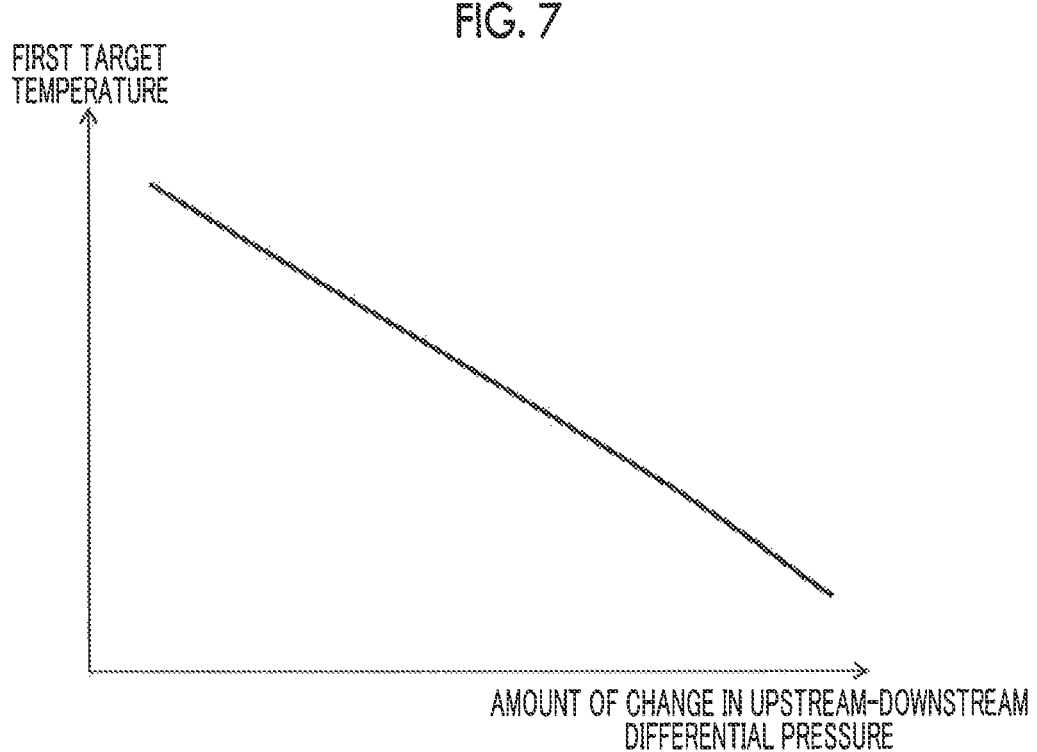
FIG. 7 is a graph that shows the relationship between an amount of change in a detected value (upstream-downstream differential pressure) of the differential pressure sensor and a first target temperature in the case where the pre-regeneration process is executed for a set time.

The predetermined period may be a set time set in advance. The set time is a time sufficiently shorter than a time required to execute the filter regeneration process, and is a short time to such an extent that slightest part of defective soot accumulated in the filter is oxidized. In this case, the electronic control unit 10 may set the first target temperature by using an amount of change in the detected value (upstream-downstream differential pressure) of the differential pressure sensor 53 during execution of the pre-regeneration process. Specifically, as shown in FIG. 7, the first target temperature in the case where an amount of change in the detected value (an amount of change in upstream-downstream differential pressure) of the differential pressure sensor 53 during the predetermined period is large should be set to a lower temperature than the first target temperature in the case where the amount of change is small. When the predetermined period is set in this way, it is possible to reduce the execution period of the pre-regeneration process to a short time as much as possible. In FIG. 7, the relationship between an amount of change in upstream-downstream differential pressure during execution of the pre-regeneration process and a first target temperature is substantially a linear relationship; however, it can be a nonlinear relationship depending on the specifications of the internal combustion engine or filter.

Figure 8:
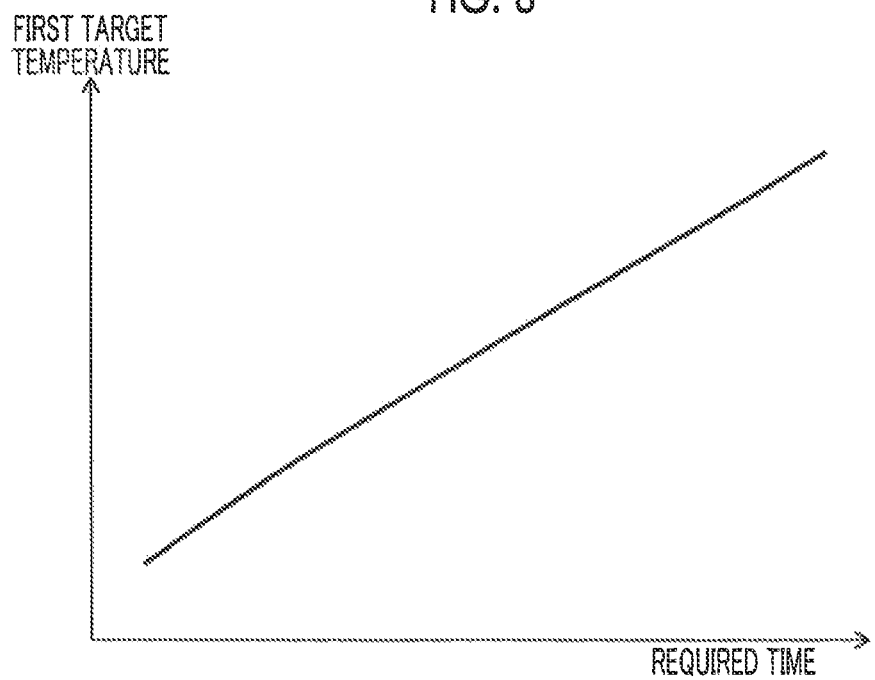
FIG. 8 is a graph that shows the relationship between a time (required time) required to execute the pre-regeneration process and a first target temperature in the case where the pre-regeneration process is executed until an amount of change in the detected value of the differential pressure sensor reaches a certain amount.

The predetermined period may be a period until an amount of change in the detected value (upstream-downstream differential pressure) of the differential pressure sensor 53 from the start of the pre-regeneration process reaches a set amount. The set amount is a value larger than variations in the amount of change in upstream-downstream differential pressure due to unevenness of the differential pressure sensor, or the like. In this case, the electronic control unit 10 may set the first target temperature by using the length of the predetermined period as a parameter. Specifically, as shown in FIG. 8, the first target temperature in the case where a time (required time) required until the amount of change in the detected value (upstream-downstream differential pressure) of the differential pressure sensor 53 from the start of the pre-regeneration process is short should be set to a lower temperature than the first target temperature in the case where the required time is long. When the predetermined period is set in this way, it is possible to further accurately detect a physical quantity that correlates with the speed of change in the upstream-downstream differential pressure during execution of the pre-regeneration process. In FIG. 8, the relationship between an execution time (required time) of the pre-regeneration process and a first target temperature is substantially a linear relationship; however, it can be a nonlinear shape depending on the specifications of the internal combustion engine or filter.

Figure 9:
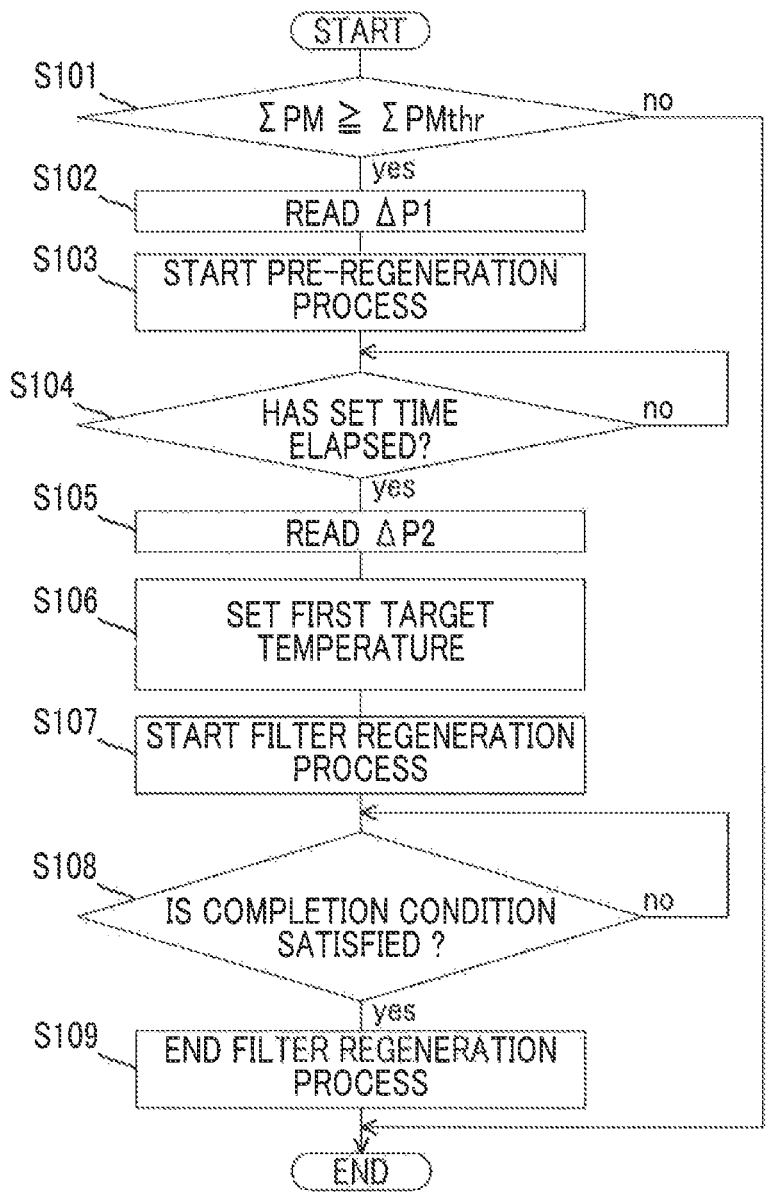
FIG. 9 is a flowchart that shows a process routine that is executed by an electronic control unit in the case where particulate matter accumulated in a filter is oxidized and removed in a first embodiment.

Hereinafter, the procedure of oxidizing and removing particulate matter accumulated in the filter 50a in the present embodiment will be described with reference to FIG. 9. FIG. 9 is a flowchart that shows a process routine that is executed by the electronic control unit 10 at the time when particulate matter accumulated in the filter 50a is oxidized and removed. This process routine is stored in the ROM of the electronic control unit 10 in advance, and is repeatedly executed by the electronic control unit 10.

In the process routine of FIG. 9, the electronic control unit 10 initially in the process of S101 determines whether the particulate matter accumulation amount $\Sigma PM$ in the filter 50a is larger than or equal to the predetermined threshold $\Sigma PMthr$. At this time, the particulate matter accumulation amount $\Sigma PM$ may be estimated from the operation state of the internal combustion engine 1 or may be estimated from the detected value (upstream-downstream differential pressure) of the differential pressure sensor 53 as described above. When negative determination is made in the process of S101, the electronic control unit 10 ends execution of the process routine without executing the pre-regeneration process or the filter regeneration process. On the other hand, when affirmative determination is made in the process of S101, the electronic control unit 10 proceeds to the process of S102.

In the process of S102, the electronic control unit 10 reads the detected value (upstream-downstream differential pressure) $\Delta P1$ of the differential pressure sensor 53. Subsequently, the electronic control unit 10 proceeds to the process of S103, and starts the pre-regeneration process. Specifically, the electronic control unit 10 raises the temperature of the filter 50a to the second target temperature, and increases the concentration of $NO_2$ contained in exhaust gas flowing into the filter 50a as compared to the concentration of $NO_2$ before execution of the pre-regeneration process. A method of adding fuel from the fuel addition valve 51 to exhaust gas or a method of performing post-injection from the fuel injection valve 3 is used as a method of raising the temperature of the filter 50a, as in the case of the above-described filter regeneration process. A method of advancing the fuel injection timing of the fuel injection valve 3 to timing before a top dead center (TDC) in a compression stroke may be used as a method of increasing the concentration of $NO_2$ in exhaust gas flowing into the filter 50a. When an EGR device for recirculating part of exhaust gas flowing through the exhaust passage 5 to the intake passage 4 as EGR gas is provided together with the internal combustion engine 1, the electronic control unit 10 increases the concentration of $NO_2$ in exhaust gas flowing into the filter 50a by reducing the amount of EGR gas that is recirculated by the EGR device as compared to the amount of EGR gas that is recirculated by the EGR device before execution of the pre-regeneration process.

In the process of S104, the electronic control unit 10 determines whether an elapsed time from the start of the pre-regeneration process is longer than or equal to a set time. When negative determination is made in the process of S104, the electronic control unit 10 continues execution of the pre-regeneration process by executing the process of S104 again. On the other hand, when affirmative determination is made in the process of S104, the electronic control unit 10 proceeds to the process of S105, and reads the detected value (upstream-downstream differential pressure) $\Delta P2$ of the differential pressure sensor 53.

In the process of S106, the electronic control unit 10 sets the first target temperature. More specifically, the speed of change in upstream-downstream differential pressure is computed by dividing the difference ($\Delta P1 - \Delta P2$) between the upstream-downstream differential pressure $\Delta P1$ read in the process of S102 and the upstream-downstream differential pressure $\Delta P2$ read in the process of S105 by the set time. The upstream-downstream differential pressure $\Delta P1$ read in the process of S102 corresponds to the upstream-downstream differential pressure of the filter 50a at the start of the pre-regeneration process. The upstream-downstream differential pressure $\Delta P2$ read in the process of S105 corresponds to the upstream-downstream differential pressure of the filter 50a at the completion of the pre-regeneration process. Subsequently, the electronic control unit 10 derives the first target temperature by accessing the above-described map of FIG. 6 using the speed of change in upstream-downstream differential pressure, obtained in the above-described procedure, as an argument. As described with reference to FIG. 7, the first target temperature may be set by using the amount of change ($\Delta P1 - \Delta P2$) in upstream-downstream differential pressure $\Delta P$ over the set time as a parameter.

In the process of S107, the electronic control unit 10 ends the pre-regeneration process, and starts the filter regeneration process. At this time, the temperature of the filter 50a is raised to the first target temperature set in the process of S106.

In the process of S108, the electronic control unit 10 determines whether a completion condition to end the filter regeneration process is satisfied. The completion condition is, for example, a condition that the execution time of the filter regeneration process is longer than or equal to a predetermined time, a condition that the detected value (upstream-downstream differential pressure) of the differential pressure sensor 53 is lower than or equal to a predetermined value, or a condition that the particulate matter accumulation amount $\Sigma PM$ that is estimated by the above-described method is smaller than or equal to a predetermined amount. When negative determination is made in the process of S108, the electronic control unit 10 executes the process of S108 again. On the other hand, when affirmative determination is made in the process of S108, the electronic control unit 10 proceeds to the process of S109, and ends the filter regeneration process.

When the electronic control unit 10 executes the process routine of FIG. 9 in this way, regeneration means according to the embodiment is implemented. As a result, even when the filter regeneration process is executed in a state where the defective soot ratio of particulate matter accumulated in the filter 50a is high, it is possible to suppress an excessive rise in the temperature of the filter 50a.

Figure 10:
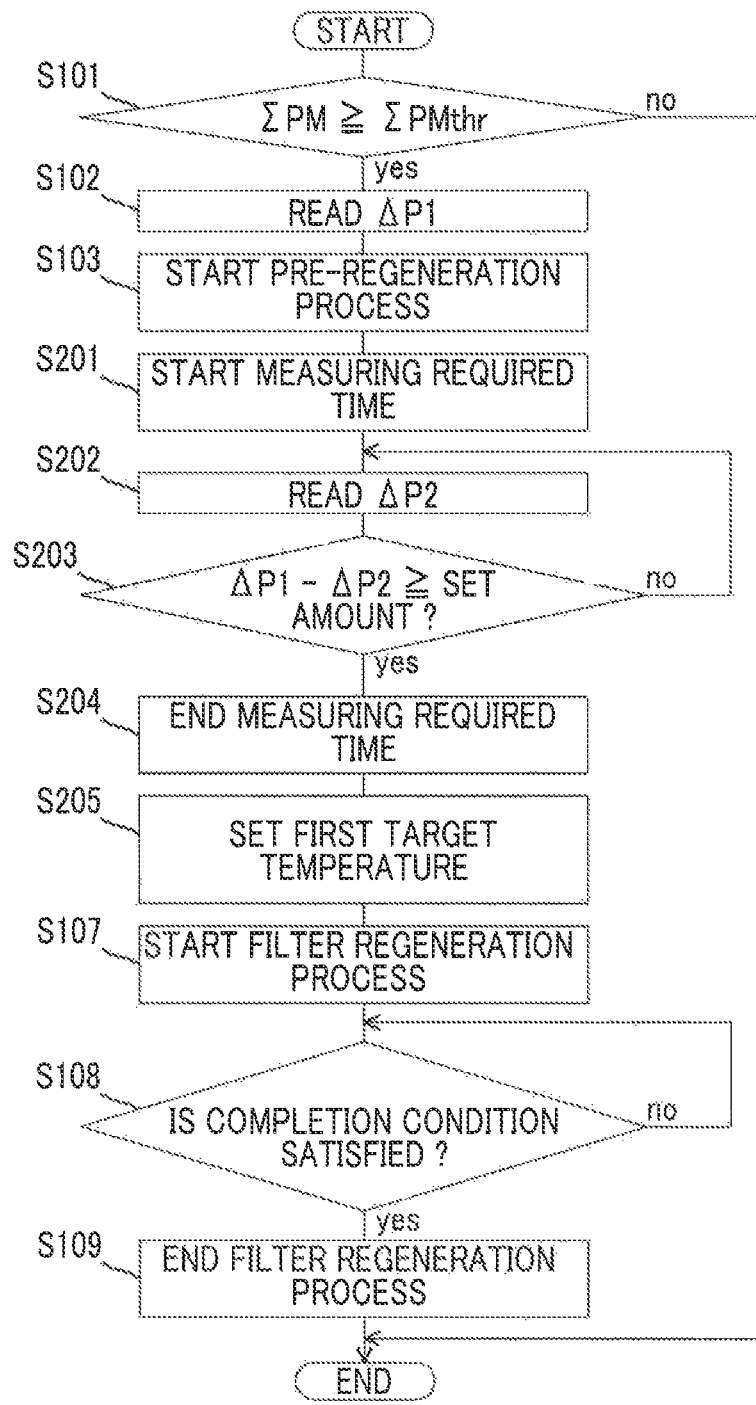
FIG. 10 is a flowchart that shows a process routine that is executed by an electronic control unit in the case where particulate matter accumulated in a filter is oxidized and removed according to an alternative embodiment to the first embodiment.

The process routine of FIG. 9 is a process routine in the case where the pre-regeneration process is executed for the set time; however, the pre-regeneration process may be executed until the amount of change in upstream-downstream differential pressure $\Delta P$ from the start of the pre-regeneration process reaches the set amount. In this case, as shown in FIG. 10, instead of the processes of S104 to S106 in FIG. 9, the processes of S201 to S205 may be executed. More specifically, the electronic control unit 10 starts measuring an elapsed time (required time) from the start of the pre-regeneration process in the process of S201. Subsequently, in the process of S202, the electronic control unit 10 reads the detected value (upstream-downstream differential pressure) $\Delta P2$ of the differential pressure sensor 53. In the process of S203, the electronic control unit 10 determines whether the difference ($\Delta P1 - \Delta P2$) between the upstream-downstream differential pressure $\Delta P1$ read in the process of S102 and the upstream-downstream differential pressure $\Delta P2$ read in the process of S202 is larger than or equal to a set amount. When negative determination is made in the process of S203, the electronic control unit 10 returns to the process of S202, and continues execution of the pre-regeneration process. On the other hand, when affirmative determination is made in the process of S203, the electronic control unit 10 proceeds to the process of S204, and ends measuring the execution time (required time) of the pre-regeneration process. The electronic control unit 10 proceeds to the process of S205, and derives the first target temperature by accessing the above-described map of FIG. 8 using the required time as an argument. With such a method, when the set amount is set to a value larger than variations in the amount of change in upstream-downstream differential pressure due to unevenness of the differential pressure sensor 53, or the like, it is possible to further accurately detect the amount of change in actual upstream-downstream differential pressure during execution of the pre-regeneration process. The electronic control unit 10 may compute the speed of change in upstream-downstream differential pressure by dividing the set amount (the amount of change ($\Delta P1 - \Delta P2$) in upstream-downstream differential pressure $\Delta P$) by the required time, and may set the first target temperature on the basis of the speed of change and the above-described map of FIG. 6.

Incidentally, the speed of change in upstream-downstream differential pressure $\Delta P$ during execution of the pre-regeneration process can vary with the flow rate of exhaust gas even when the defective soot ratio of particulate matter accumulated in the filter 50a remains unchanged. For this reason, the pre-regeneration process may be executed in a steady operation state, such as an idle operation state.

Figure 11:
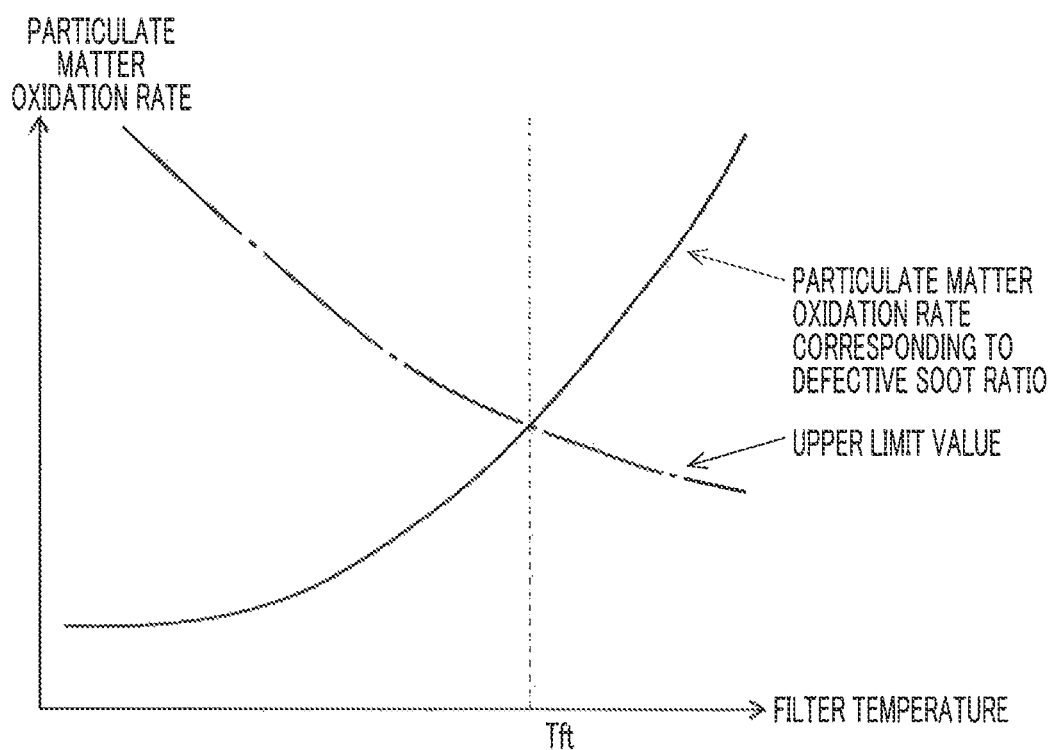
FIG. 11 is a graph that illustrates the procedure of setting a first target temperature on the basis of the relationship between a filter temperature and a regeneration rate, which corresponds to a defective soot ratio, in a second embodiment.

Next, a second embodiment will be described with reference to FIG. 11. Components different from those of the above-described first embodiment will be described here, and the description of similar components is omitted.

The above-described first embodiment differs from the present embodiment in that the relationship between a temperature of the filter 50a (hereinafter, simply referred to as filter temperature) and a particulate matter oxidation rate, which corresponds to the speed of change in upstream-downstream differential pressure ΔP during execution of the pre-regeneration process, is obtained and the filter temperature at which the particulate matter oxidation rate is equal to a predetermined upper limit value in this relationship is set to the first target temperature.

Specifically, the electronic control unit 10 initially converts the speed of change in upstream-downstream differential pressure ΔP to the oxidation rate of defective soot on the basis of the correlation between an upstream-downstream differential pressure ΔP and a particulate matter accumulation amount ΣPM. Subsequently, the electronic control unit 10 computes the amount of accumulated defective soot on the basis of the following mathematical expression (1).

[Defective soot accumulation amount]=[Defective soot oxidation rate]/([Concentration of NO$_2$]* [Concentration of O$_2$]*$k$)     (1)

In the above mathematical expression (1), the concentration of NO$_2$ is the concentration of NO2 in exhaust gas flowing into the filter 50a during execution of the pre-regeneration process. The concentration of O$_2$ is the concentration of O2 in exhaust gas flowing into the filter 50a during execution of the pre-regeneration process. k denotes a coefficient that is set on the basis of the temperature of exhaust gas.

Subsequently, the electronic control unit 10 computes a defective soot ratio by dividing the defective soot accumulation amount calculated on the basis of the above-described mathematical expression (1) by the total amount of particulate matter (particulate matter accumulation amount ΣPM) accumulated in the filter 50a. The electronic control unit 10 estimates the relationship between a filter temperature and a particulate matter oxidation rate on the assumption that particulate matter of the defective soot ratio computed in this way is accumulated in the filter 50a. Specifically, the relationship between a filter temperature and a particulate matter oxidation rate, which corresponds to the defective soot ratio computed as described above, should be extracted from the relationship described in the graph of FIG. 4. The above-described relationship shown in FIG. 4 is empirically obtained in advance.

Subsequently, the electronic control unit 10 obtains a filter temperature at which the particulate matter oxidation rate is equal to a predetermined upper limit value in the relationship between a filter temperature and a particulate matter oxidation rate, obtained in the above-described procedure, and sets the filter temperature for the first target temperature. FIG. 11 is a graph that illustrates a method of obtaining a filter temperature at which the particulate matter oxidation rate is equal to the predetermined upper limit value in the relationship between a filter temperature and a particulate matter oxidation rate. The continuous line in FIG. 11 represents the relationship between a filter temperature and a particulate matter oxidation rate, which corresponds to the defective soot ratio. The alternate long and short dashes line in FIG. 11 indicates the predetermined upper limit value. The upper limit value is presumably such a value that, when the particulate matter oxidation rate exceeds the upper limit value, the temperature of the filter 50a can excessively rise during execution of the filter regeneration process. The upper limit value is set so as to be a smaller value as the filter temperature rises. This is because the amount of particulate matter that is oxidized per unit time tends to increase as the filter temperature rises and, accordingly, the filter temperature tends to excessively rise. In the present embodiment, as shown in FIG. 11, in the relationship between a filter temperature and a particulate matter oxidation rate, which corresponds to the defective soot ratio, a temperature at which the particulate matter oxidation rate is equal to the predetermined upper limit value (Tft that is the intersection of the continuous line with the alternate long and short dashes line in FIG. 11) is set for the first target temperature.

According to the present embodiment, it is possible to set the first target temperature to a temperature as high as possible within the range in which it is possible to suppress an excessive rise in the temperature of the filter 50a. As a result, when the filter regeneration process is executed on the basis of such a first target temperature, it is possible to further efficiently oxidize and remove particulate matter accumulated in the filter 50a while suppressing an excessive rise in the temperature of the filter 50a.

Particulate matter accumulated in the filter 50a can contain soluble organic fraction. Soluble organic fraction is more easily oxidizable than defective soot. For this reason, when soluble organic fraction is accumulated in the filter 50a, the speed of change in upstream-downstream differential pressure ΔP during execution of the pre-regeneration process increases as compared to when soluble organic fraction is not accumulated in the filter 50a. Thus, the first target temperature, which is set on the basis of the speed of change in upstream-downstream differential pressure ΔP during execution of the pre-regeneration process, in the case where soluble organic fraction is accumulated in the filter 50a is lower than the first target temperature in the case where soluble organic fraction is not accumulated in the filter 50a. As a result, although the temperature of the filter 50a is difficult to rise, it may not be able to efficiently oxidize and remove particulate matter accumulated in the filter 50a.

Therefore, before execution of the pre-regeneration process, a soluble organic fraction removal process that is the process of oxidizing and removing soluble organic fraction accumulated in the filter 50a may be executed. The soluble organic fraction removal process is the process of raising the temperature of the filter 50a to a temperature that is lower than the second target temperature during execution of the pre-regeneration process and at which the soluble organic fraction oxidizes. At this time, a method of adding fuel from the fuel addition valve 51 to exhaust gas or a method of performing post-injection from the fuel injection valve 3 is used as a method of raising the temperature of the filter 50a, as well as the above-described filter regeneration process or pre-regeneration process.

In this way, when the soluble organic fraction removal process is executed before execution of the pre-regeneration process, it is possible to suppress a decrease in the efficiency of the filter regeneration process due to accumulation of soluble organic fraction. The soluble organic fraction removal process may be definitely executed before execution of the pre-regeneration process irrespective of whether soluble organic fraction is actually contained in particulate matter accumulated in the filter 50a. Instead, the soluble organic fraction removal process may be executed only when it is estimated that the proportion of the amount of soluble organic fraction contained in particulate matter accumulated in the filter 50a (hereinafter, referred to as soluble organic fraction ratio) exceeds a predetermined ratio. At this time, the soluble organic fraction ratio should be estimated on the basis of the history of the operation of the internal combustion engine 1, the history of the temperature of the filter 50a, or the like. The predetermined ratio is such a value that, when the soluble organic fraction ratio at the time when the pre-regeneration process is executed exceeds the predetermined ratio, the efficiency of the filter regeneration process decreases. The predetermined ratio is obtained through adaptation work by utilizing an experiment, or the like, in advance.

What is claimed is:

1. An exhaust gas control system for an internal combustion engine, the exhaust gas control system comprising:
   a filter arranged in an exhaust passage of the internal combustion engine, the filter being configured to collect particulate matter that is emitted from the internal combustion engine;
   a differential pressure sensor configured to detect an upstream-downstream differential pressure that is a difference between an exhaust pressure upstream of the filter and an exhaust pressure downstream of the filter; and
   an electronic control unit configured to
   i) acquire a particulate matter accumulation amount that is an amount of particulate matter collected in the filter,
   ii) execute a filter regeneration process, the filter regeneration process being a process of, when the particulate matter accumulation amount is larger than or equal to a predetermined threshold, oxidizing and removing particulate matter collected in the filter by raising a temperature of the filter to a first target temperature,
   iii) execute a pre-regeneration process for a predetermined period and execute the filter regeneration process after completion of the pre-regeneration process, the pre-regeneration process being a process of, when the particulate matter accumulation amount becomes larger than or equal to the predetermined threshold, raising the temperature of the filter to a second target temperature lower than the first target temperature and increasing the concentration of nitrogen dioxide contained in exhaust gas flowing into the filter, and
   iv) set the first target temperature and execute the filter regeneration process such that the first target temperature in the case where a speed of change in a detected value of the differential pressure sensor during execution of the pre-regeneration process is a first speed is lower than the first target temperature in the case where the speed of change is a second speed, the first speed being higher than the second speed.

2. The exhaust gas control system according to claim 1, wherein
   the predetermined period is a set time set in advance, and
   the electronic control unit is configured to
   v) obtain an amount of change in the detected value of the differential pressure sensor in the predetermined period as a physical quantity that correlates with the speed of change in the detected value of the differential pressure sensor during execution of the pre-regeneration process, and vi) set the first target temperature and execute the filter regeneration process such that the first target temperature in the case where the amount of change is a first amount is lower than the first target temperature in the case where the amount of change is a second amount, the first amount being larger than the second amount.

3. The exhaust gas control system according to claim 1, wherein
   the predetermined period is a time period from execution of the pre-regeneration process until an amount of change in the detected value of the differential pressure sensor reaches a set amount set in advance, and
   the electronic control unit is configured to
   vii) obtain the predetermined period as a physical quantity that correlates with the speed of change in the detected value of the differential pressure sensor during execution of the pre-regeneration process, and
   viii) set the first target temperature and execute the filter regeneration process such that the first target temperature in the case where the predetermined period is a first period is lower than the first target temperature in the case where the predetermined period is a second period, the first period being shorter than the second period.

4. The exhaust gas control system according to claim 1, wherein
   the electronic control unit is configured to
   ix) based on such a characteristic that an oxidation rate of the particulate matter accumulated in the filter in the case where the speed of change in the detected value of the differential pressure sensor during execution of the pre-regeneration process is the first speed is higher than the oxidation rate of the particulate matter accumulated in the filter in the case where the speed of change is the second speed and the oxidation rate of the particulate matter accumulated in the filter in the case where the temperature of the filter is a first temperature is higher than the oxidation rate of the particulate matter accumulated in the filter in the case where the temperature of the filter is a second temperature, the first temperature being higher than the second temperature, estimate a relationship between the temperature of the filter and the oxidation rate of the particulate matter accumulated in the filter, the relationship corresponding to the speed of change in the detected value of the differential pressure sensor during execution of the pre-regeneration process, and
   x) obtain a temperature of the filter at which the oxidation rate of the particulate matter is equal to a predetermined upper limit value in the estimated relationship, and set the obtained temperature for the first target temperature.

5. The exhaust gas control system according to claim 1, wherein
   the electronic control unit is configured to
   xi) execute a soluble organic fraction removal process before executing the pre-regeneration process, the soluble organic fraction removal process being a process of oxidizing and removing soluble organic fraction accumulated in the filter by raising the temperature of the filter to a third target temperature at which the soluble organic fraction oxidizes, and the third target temperature being a temperature that is lower than the second target temperature.

* * * * *